United States Patent
Prabhuk et al.

(10) Patent No.: US 8,704,574 B2
(45) Date of Patent: Apr. 22, 2014

(54) SSPC DISTRIBUTION SYSTEM AND CONTROL STRATEGY

(75) Inventors: Prashant Purushotham Prabhuk, Bangalore (IN); Narendra Rao, Bangalore (IN); Ezekiel Poulose Aikkaravelil, Chotanikara (IN); Vinod Kunnambath, Thrissur (IN); Randy Fuller, Hillsburgh (CA); David Lazarovich, Thornhill (CA); Zhenning Liu, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 39 days.

(21) Appl. No.: 13/372,282

(22) Filed: Feb. 13, 2012

(65) Prior Publication Data

US 2013/0207705 A1 Aug. 15, 2013

(51) Int. Cl.
H03K 3/289 (2006.01)

(52) U.S. Cl.
USPC .............................. 327/202; 327/203; 327/204

(58) Field of Classification Search
USPC .......................................... 327/202, 203, 204
See application file for complete search history.

(56) References Cited

U.S. PATENT DOCUMENTS

| | | | |
|---|---|---|---|
| 5,752,047 A | 5/1998 | Darty et al. | |
| 6,816,758 B2 | 11/2004 | Maxwell et al. | |
| 6,856,045 B1 | 2/2005 | Beneditz et al. | |
| 7,634,329 B2 * | 12/2009 | Liu et al. | 700/292 |

FOREIGN PATENT DOCUMENTS

| | | |
|---|---|---|
| EP | 1 643 608 A2 | 4/2006 |
| EP | 1 840 688 A2 | 10/2007 |
| EP | 1 973 018 A2 | 9/2008 |
| EP | 1 973 214 A2 | 9/2008 |

OTHER PUBLICATIONS

European Patent Office Search Report, Application No. 13153127.7-1802, dated May 31, 2013.

* cited by examiner

*Primary Examiner* — John Poos
(74) *Attorney, Agent, or Firm* — Shimokaji & Associates P.C.

(57) ABSTRACT

A power distribution system includes the use of a master digital signal processor (DSP) and two slave DSPs connected to the master DSP. The slaves DSPs may be connected to each of a plurality of solid state power channels (SSPC) controlling power distribution functions to each of the channels. A power control strategy may use one power supply for the master DSP, a second power supply shared between the slave DSPs, and a third power supply shared between each of the SSPC channels.

14 Claims, 4 Drawing Sheets

SSPC DISTRIBUTION SYSTEM AND CONTROL STRATEGY

BACKGROUND OF THE INVENTION

The present invention generally relates to power distribution systems and more particularly, a solid state power controller (SSPC) distribution system (i.e. a line replaceable module, or a circuit card) and control strategy.

Power distribution systems typically employ a switching mechanism to supply power to various loads in an aircraft. Typically, a single load is associated with a single distribution channel and a dedicated switching mechanism is employed per channel to provide the power needs as required. The SSPC is one such switching mechanism employed in aircraft systems to distribute electric power among various loads. As the number of desired distribution channels in an aircraft increases and more aircraft functions are required to be incorporated into each power distribution channel, the resulting power distribution systems pose serious challenges to the aircraft design in terms of potentially increased system complexity and therefore worsened mean time between failures (MTBF), and increased system weight, and volume.

As can be seen, there is a need for a power distribution system and strategy that may make more effective use of space and have improved system reliability in terms of MTBF.

SUMMARY OF THE INVENTION

In one aspect of the present invention, a solid state power controller (SSPC) system comprises a plurality of SSPC channels configured to provide power distribution functions; a master digital signal processor (DSP); a first slave DSP connected to the master DSP; a second slave DSP connected to the master DSP, wherein each of the plurality of SSPC channels are connected to both the first slave DSP and second slave DSP.

In another aspect of the present invention, a solid state power controller (SSPC) system comprises a plurality of SSPC channels configured to provide power distribution functions; a master digital signal processor (DSP); a first power source connected to the master DSP; a first slave DSP connected to the master DSP; a second slave DSP connected to the master DSP, wherein each of the plurality of SSPC channels are connected to both the first slave DSP and second slave DSP; a second power source isolated from the first power source; and a third power source shared by the plurality of SSPC channels.

In still yet another aspect of the present invention, a method of providing power distribution functions in a line replaceable module includes providing control commands from a master digital signal processor (DSP) to a pair of slave DSP in a power distribution system; and controlling power distribution functions distributed through a plurality of solid state power channels (SSPC) using the pair of slave DSP wherein the pair of slave DSP are both connected to each channel in the plurality of SSPC channels.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to e taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a power distribution system and method. Aspects of the subject technology may be useful, for example, in aircraft based control systems where space and weight factors may be at a premium.

Figure 1:
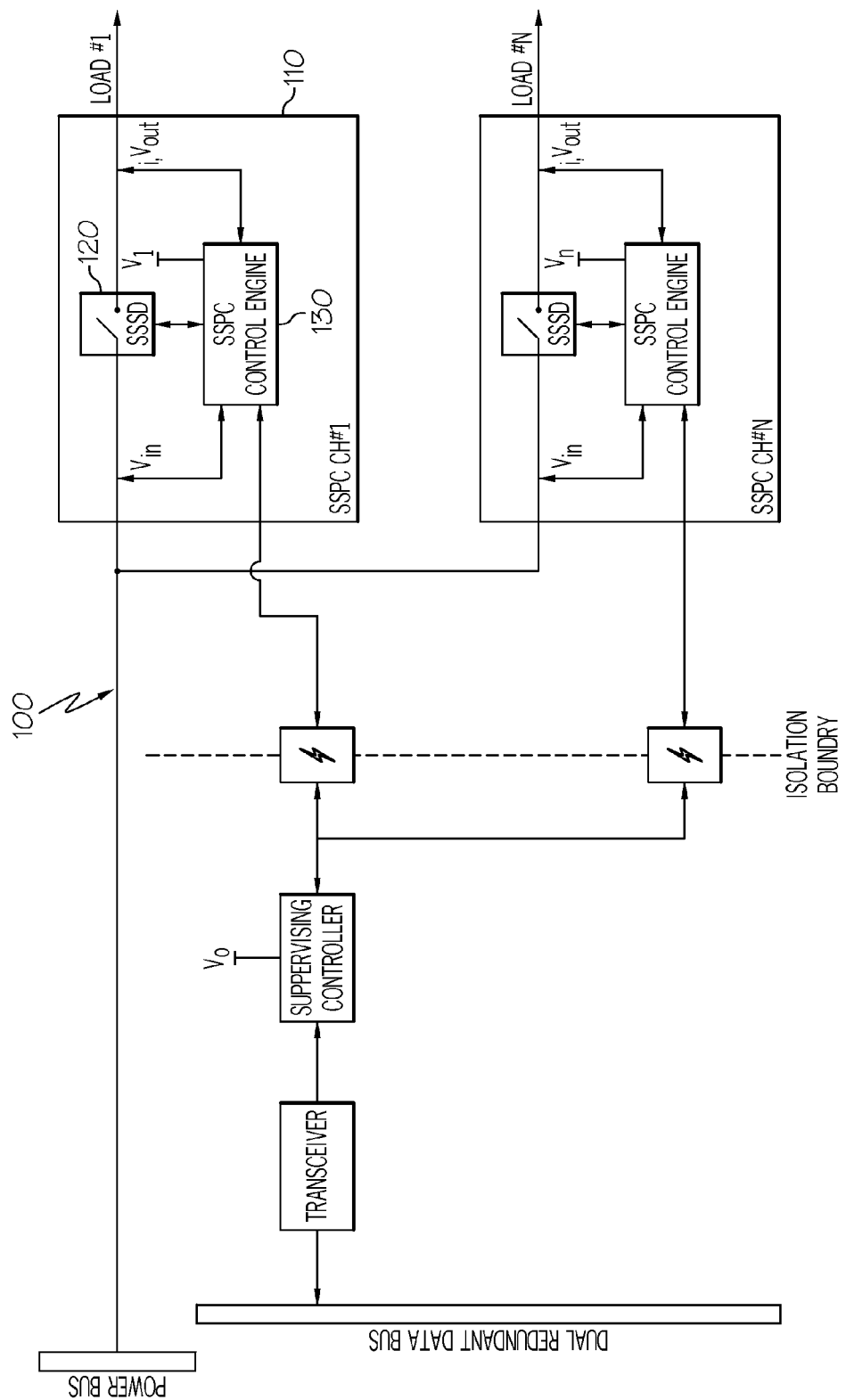
FIG. 1 is a schematic diagram of a power distribution system in accordance with an aspect of the subject technology.

Referring to FIG. 1, an aircraft power distribution system (not shown) may comprise a number of power distribution units (PDUs) (not shown), each further comprising several SSPC line replaceable modules (LRMs) 100. Each SSPC LRM 100 may comprise multiple SSPC channels 110. A typical SSPC channel 110 may include a solid state switching device (SSSD) 120, which performs the fundamental power on/off switching, and an SSPC processing engine 130 dedicated to the channel, which is responsible for SSSD on/off control and feeder wire protection. Each SSPC control engine 130 requires an isolated power supply, $V_i$ (i=1, 2, . . . n). The SSPC processing engine 130 can be built by either programmable devices, such as micro-controllers, DSPs, field programmable gate arrays (FPGAs), discrete analog and digital circuitry, or application specific integrated circuits (ASICs). The control of the SSSD 120 through the SSPC processing engine 130 is usually configured as the "high side" drive with an isolated control power supply reference to the source terminal of for example, a MOSFET to provide required gate drive power. The SSPC processing engine 130 may also be placed on the "high side" for load current sensing and processing, as well as data communication between the SSPC channel and the LRM level controller.

The number of isolated power supplies and SSPC processing engines increases as more SSPC channels are required to be implemented on a LRM 100. For example, more advanced power distribution functions may be needed in the system such as arc fault detection (AFD), electric load fault diagnostics, and prognostics, etc. Increasing the amount of SSPC channels may increase the power dissipation of the LRM 100, which can negatively impact the mean time between failures (MTBF) of the LRM 100. More SSPC channels 110 may also take up significant board area, which limits the number of SSPC channels that can be incorporated making the board layout more difficult.

Figure 2:
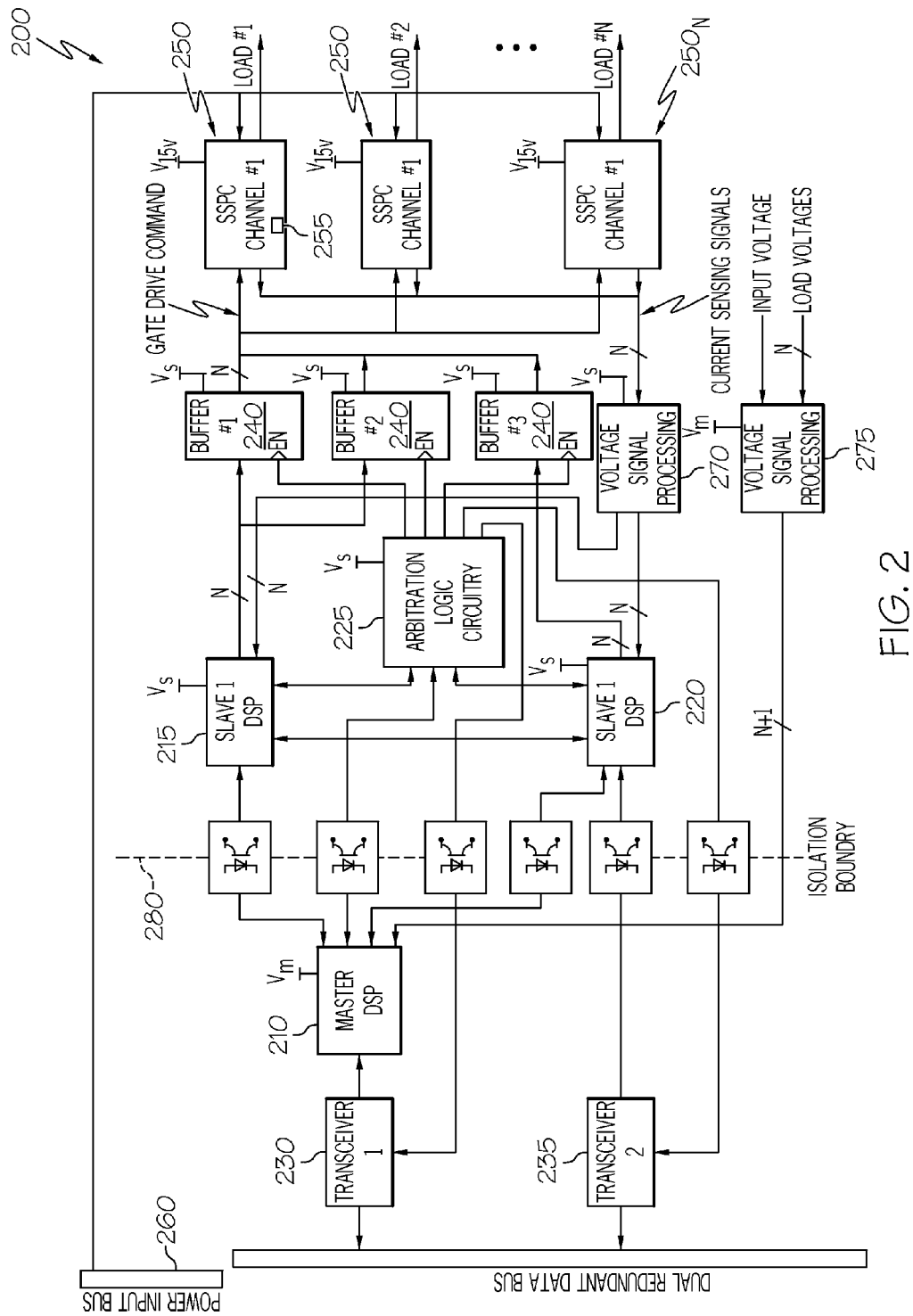
FIG. 2 is a block diagram of a power distribution system in accordance with an exemplary embodiment of the present invention.

Referring now to FIG. 2, a SSPC distribution system 200 is shown in accordance with an exemplary embodiment of the present invention. FIG. 2 shows the SSPC distribution system 200 in a block diagram showing components in electrical communication. The SSPC distribution system 200 may be embodied as an LRM and referred to interchangeably as the LRM 200. Each LRM 200 may include three digital signal processors, a master DSP 210, a slave DSP 215, and a slave DSP 220 and logic circuitry, which may be referred to as an arbitration logic module 225. It will be understood that the logic circuitry may not necessarily be a programmable device. The master DSP 210 is in communication with the slave DSP 215 and slave DSP 220. In an exemplary embodiment, the slave DSP 215 may be in communication with the slave DSP 220. The arbitration logic module 235 may be in communication with the master DSP 210, the slave DSP 215, and the slave DSP 220. The communication between the master DSP 210, the slave DSP 215, the slave DSP 220, and the arbitration logic module 225 may be commutative. A voltage signal processing unit 275 may be connected to the master DSP 210.

The LRM 200 may also include a plurality of SSPC channels 250 ... 250n. For sake of illustration, the SSPC channels 250 ... 250n may be referred to as SSPC channels 250. Each of the SSPC channels 250 may be connected to the slave DSP 215 and the slave DSP 220 simultaneously. Each of the SSPC channels 250 may include a MOSFET gate driver 255. For sake of illustration, only "SSPC Channel #1" (250) is illustrated with the MOSFET gate driver 255. A current signal processing unit 270 may be in communication with each of the SSPC channels 250 and the slave DSP 220. The current signal processing unit 270 may be configured to receive a current sensing signal from respective SSPC channels 250 for processing the management of power back to respective SSPC channels 250.

An isolation boundary 280 may electrically isolate the master DSP 210 from the slave DSP 215, slave DSP 220, the arbitration logic module 225, and the SSPC channels 250. A transceiver 230 and a transceiver 235 may be connected to a dual redundant data bus 265. The transceiver 230 may be in communication with the master DSP 210. The transceiver 235 may be in communication with the slave DSP 220.

The master DSP 210 may be designated as a LRM 200 supervisor and may be configured for communication through serial communication interfaces (such as ARINC429 and CAN, etc.) with external control equipment. The master DSP 210 may also be configured to perform general housekeeping tasks, SSPC load configuration controls, and periodic built-in-test (BIT) for the LRM 200. The master DSP 210 may interface to a test data bus (e.g. RS-422), which may facilitate operating software and configuration data loading, software testing and debugging.

In another aspect, the master DSP 210 may also be configured with programming capable of managing the responsibilities of the slave DSP 215 and slave DSP 220. The slave DSP 215 and slave DSP 220 may be configured to perform SSPC channel controls including load status monitoring and feeder wire protections, etc. The responsibilities of the slave DSP 215 and the slave DSP 220 may be partitioned for efficient control of the SSPC channels 250. In an exemplary operation, slave DSP 215 may be configured for example, to manage power commutation, over-current protection, and parallel arc fault detection. The slave DSP 220 may be configured, for example, to monitor load current and series arc fault detection. The gains of current sensing signals feeding to the slave DSP 215 and to slave DSP 220 through current signal processing unit 270 may be selected differently to achieve optimal SSPC performance. The current level for normal load current monitoring and series arc fault detection may usually be around and below the nominal value of the SSPC channel rating. The current level for wire protection and parallel arc fault detection may usually be much higher than the nominal value of the SSPC channel rating.

In one aspect, the LRM 200 may be configured to provide fundamental redundancy controls in case any one of the master DSP 210, slave DSP 215, or slave DSP 220 fails to operate properly. For example, the responsibilities of slave DSP 215 and slave DSP 220 may be either partially or wholly interchangeable between the two. Operational software facilitating each individual DSP function may be allocated on both slave DSP 215 and slave DSP 220 with options to select any or all portions of the software to run on any one of the slave DSPs 215; 220. The arbitration between the master DSP 210 and slave DSPs 215; 220 may be realized by the arbitration logic module 225, along with digital buffers 240. The slave DSP 215 and the slave DSP 220 may be isolated from the gate driver circuitry within the SSPC channels 250 by the buffers 240.

In an exemplary embodiment, the system 200 may employ three buffers 240. For sake of illustration, the three buffers 240 shown are designated as buffer #1, buffer #2, and buffer #3. In one exemplary embodiment, buffer #2 may be designated to store the pre-loaded SSPC channel on/off states, which may be enabled when both slave DSPs (215; 220) fail to operate properly, so that all SSPC channels on the LRM 200 can be in their fail-safe states. For example, buffer #2 may be loaded with data by Slave DSP 215 immediately after the slave DSP 215 completes its power up reset. In the event both the slave DSP 215 and slave DSP 220 fail to operate properly, only buffer #2, which may contain the pre-loaded SSPC channel on/off states, will be enabled, so that all SSPC channels 250 will be in their fail-safe states.

In an exemplary operation, only buffer #1 may be enabled by the arbitration logic module 225, so that slave DSP 215 has the control over all SSPC channels 250. When DSP 215 has control over all the SSPC channels 250, buffer #2 and buffer #3 may be disabled. When an abnormality (for example, an operating software malfunction that results in for example, a "no proper response" message to the arbitration logic module 225), in the slave DSP 215 is detected by the arbitration logic module 225, only buffer #3 will be enabled, to allow the slave DSP 220 to take over the control of all SSPC channels 250.

If an abnormality in the master DSP 210 is detected by the arbitration logic module 225 and registered by either the slave DSP 215 or slave DSP 220, the transceiver 230, that may be enabled by default, may be disabled, and transceiver 235, that may be disabled by default, may be enabled, so that the slave DSP 220 can take over the communication function between the LRM 200 and the external control equipment (not shown). In some instances where the slave DSP 220 takes over control of the communication function normally performed by the master DSP 210, voltage monitoring functions from the voltage signal processing unit 275, which may not be considered critical for SSPC operations, may be lost.

In another exemplary operation, in the event the slave DSP 220 fails to operate properly, the slave DSP 215 may "switch on" the part of the software designated to the slave DSP 220 to perform functions for both the slave DSP 215 and slave DSP 220. There may be potentially degraded performance of the slave DSP 220 functions as a result of non-optimized current sensing gain configured for the optimal performance of the slave DSP 215.

Figure 3:
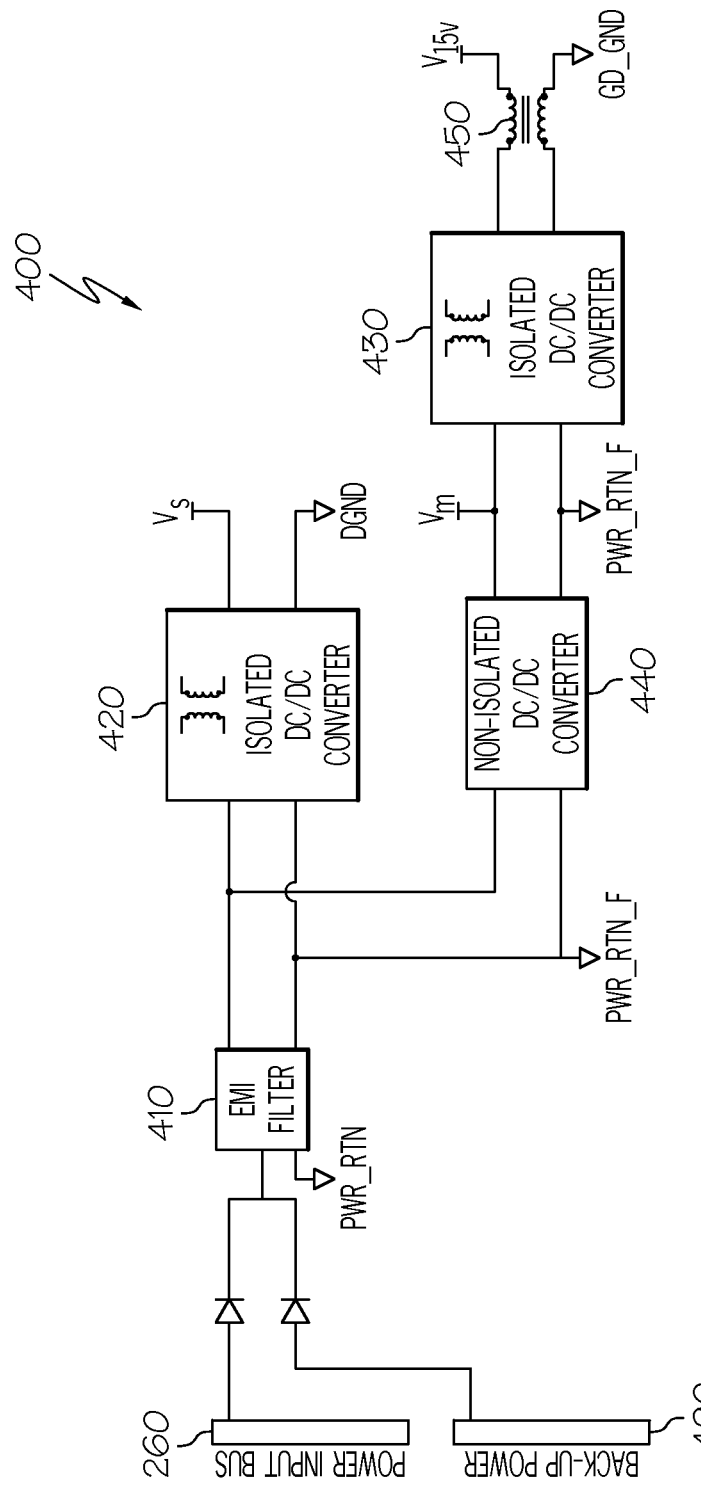
FIG. 3 is a schematic diagram of a power control strategy employed in the power distribution system of FIG. 2 in accordance with an exemplary embodiment of the present invention.
Figure 4:
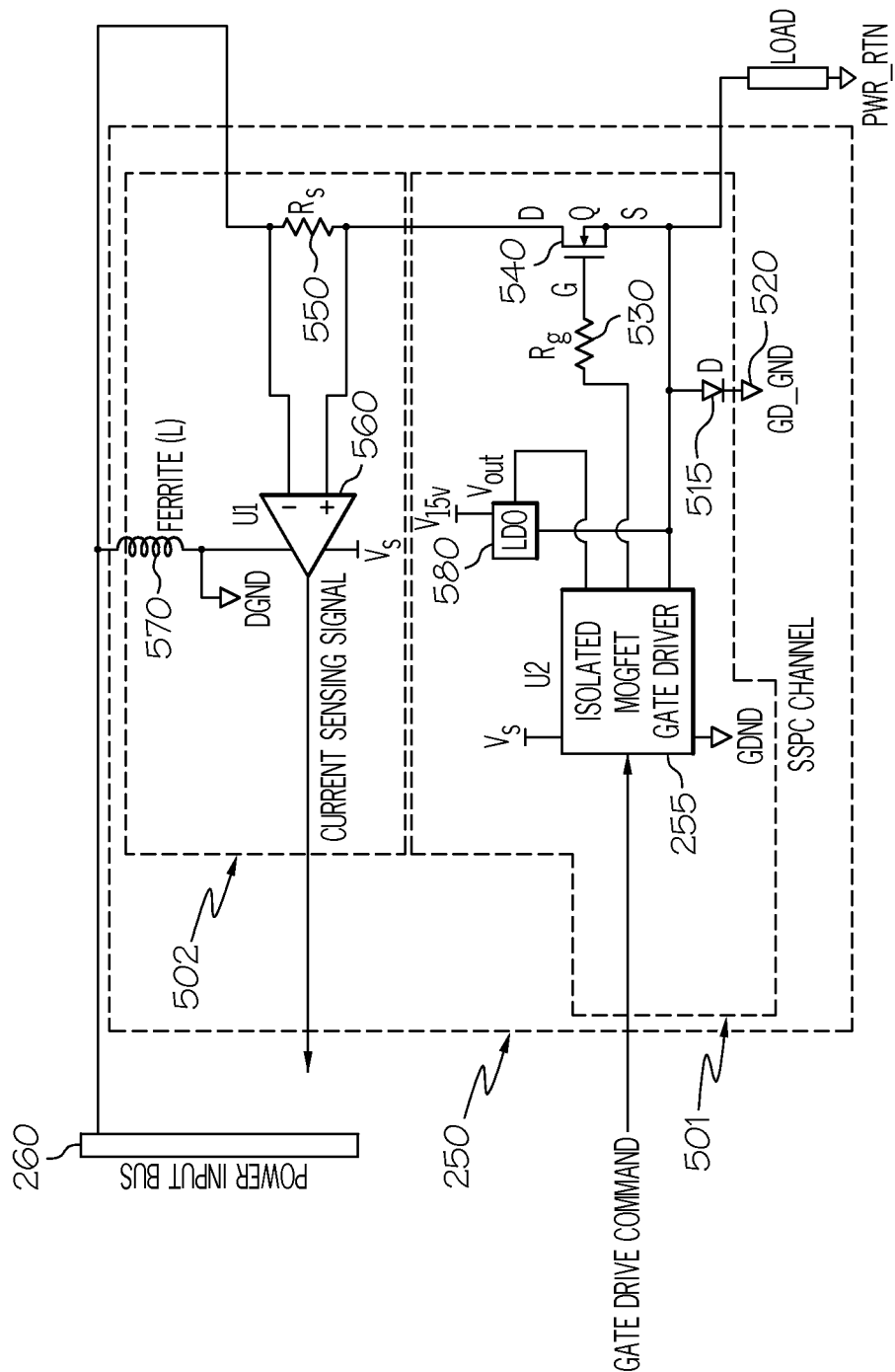
FIG. 4 is a schematic diagram of an exemplary SSPC channel of the power distribution system of FIG. 2 showing gate driving and current sensing strategies in accordance with an exemplary embodiment of the present invention

Referring now to FIGS. 2 and 3, power supply strategies are shown in accordance with an exemplary embodiment of the present invention. Power to the master DSP 210, the slave DSP 215, slave DSP 220, the arbitration logic module 225, the buffers 240, the SSPC channels 250, the current signal processing unit 270, and the voltage signal processing unit 275 may be derived from a main power input bus 260. The main power input bus 260 may be, for example, a 28V bus. A back-up power source 490, for example a 28VDC source (diode ORed from the main power input bus 260) may also provide power to the system 200 when needed. Power from the main power input bus 260 and the back-up power source 490 may be filtered through an EMI filter 410. For high voltage DC SSPC applications (e.g. 270VDC), voltage conversion, for example, a step-down conversion to 28VDC, may be done for the main power input bus 260 before being diode ORed with the back-up power source 490.

A power supply scheme 400 may provide separate but minimal power supply sources for different sections of the system 200. In one aspect, only three control power supplies, ($V_M$, $V_S$, and $V_{15V}$) may be needed to provide the control needs for the entire SSPC distribution system 200. In one exemplary embodiment, an isolated DC-DC converter 420 may be connected to the EMI filter 410 configured to provide the $V_S$ power supply. $V_S$ may be an isolated power source, supplied by the main power input bus 260. $V_S$ may be disposed to power the slave DSP 215, the slave DSP 220, (and associated digital circuitry) the buffers 240, and the current signal processing unit 270. A non-isolated DC-DC converter 440 may be connected to the EMI filter 410 configured to provide the $V_M$ power supply. $V_M$ may be a non-isolated control power source, supplied by the main power input bus 260. $V_M$ may be disposed to generate power to the master DSP 210, transceivers 230; 235, and the voltage signal processing unit 275. Another isolated DC-DC converter 430 may be connected to the non-isolated DC-DC converter 440 and a transformer 450 configured to provide the $V_{15V}$ power supply. $V_{15V}$ may be an isolated power source disposed to provide the necessary isolated power for the MOSFET gate drives of all SSPC channels 250. Thus, a single power source $V_{15V}$ can be employed to power multiple SSPC channels 250. It will be understood that the power needed to drive the SSPC channels 250 may vary depending on the loads and the choice of isolated DC-DC converter 430 and transformer 450 may thus vary with the needs of the SSPC channels 250.

Referring now to FIG. 5, a schematic of an exemplary SSPC channel 250 is shown. The SSPC channel 250 may include exemplary current sensing and gate drive strategies. In a gate driving section 501, the SSPC channel 250 may include a MOSFET gate driver 255, a MOSFET 540 (e.g. Linear Technology's LTC4440), a linear and low dropout regulator (LDO) 580, and a diode 515, configured to control the independent power needs from each SSPC channel 250 to respective loads. A current sensing section 502 may include a shunt resistor 550, a differential amplifier 560, and an inductor 570. The amplifier 560 may be, for example, an op-amp or a current shunt monitor integrated circuit. The inductor 570 may use, for example, a ferrite core. A gate drive ground 520 may be common to all the SSPC channels 250.

In the current sensing section 502, the shunt resistor 550 is connected to the amplifier 560 and between the main power input bus 260 and the drain of the MOSFET 540. The shunt resistor 550 may have a very low resistance value. The voltage across the resistor 550 may provide how much current is passing through the MOSFET 540. The amplifier 560 may be configured to amplify the signal passing through the resistor 550. The amplified signal may thus be passed on to the current signal processing unit 270 and the slave DSP 220 (FIG. 2). In one exemplary embodiment, each SSPC channel 250 may share a common ground reference ($D_{GND}$). Thus it may be appreciated that a single power source $V_S$ may be employed to power each of the amplifiers 560 of respective SSPC channels 250 when using the common ground reference ($D_{GND}$) while managing voltage control of the MOSFET 540 as measured across the resistor 550. The use of the inductor 570 connected between the main power input bus 260 and the common ground ($D_{GND}$) may provide EMI control.

In the gate driving section 501, the $V_{15V}$ power supply may be connected in common with each SSPC channels 250 as discussed previously. The LDO 580 may be connected between the source of the $V_{15V}$ power supply, the gate driver 255, and the diode 515. The LDO 580 may ensure that the gate to source voltage of the MOSFETs 540 of respective SSPC channels 250 never exceeds a safe voltage level under all SSPC operating conditions. For example, when a particular SSPC channel 250 is switched off, the voltage from any other SSPC channel 250 on the line may be regulated by the LDO 580 so that a safe voltage is encountered by the gate driver 255 and the MOSFET 540. Since the gate current for the MOSFETs 540 under both on or off states are negligible, the LDO 580 can never be over stressed. The diode 515 ensures no interaction between SSPC channels 250 through its reverse voltage blocking capability while still allowing the common power supply $V_{15V}$ to provide the valid and required gate drive power for the associated particular SSPC channel. The diode 515 may be rated to withstand the highest possible voltage difference between any two SSPC channels 250.

It should be understood, of course, that the foregoing relates to exemplary embodiments of the invention and that modifications may be made without departing from the spirit and scope of the invention as set forth in the following claims.

We claim:

1. A solid state power controller (SSPC) system, comprising:
    a plurality of SSPC channels configured to provide power distribution functions;
    a master digital signal processor (DSP);
    a first slave DSP connected to the master DSP;
    a second slave DSP connected to the master DSP, wherein each of the plurality of SSPC channels are connected to both the first slave DSP and second slave DSP; and
    an arbitration logic module connected to the master DSP, the first slave DSP, and the second slave DSP.

2. The SSPC controller system of claim 1 wherein the first slave DSP is connected to the second slave DSP.

3. The SSPC controller system of claim 1 wherein the second slave DSP is configured to control the plurality of SSPC channels in the event the first slave DSP fails.

4. The SSPC controller system of claim 1 further comprising a MOSFET driver in each of the plurality of SSPC channels, the MOSFET driver configured to receive power distribution function signals from the master DSP, the first slave DSP, and the second slave DSP.

5. The SSPC controller system of claim 1 further comprising:
    a first power source connected to the master DSP;
    a second power source connected to the first slave DSP and the second slave DSP; and
    a third power source connected to the plurality of SSPC channels.

6. The SSPC controller system of claim 5 wherein the first power source is a non-isolated power source and the second power source is an isolated power source.

7. A solid state power controller (SSPC) system, comprising:

a plurality of SSPC channels configured to provide power distribution functions;
a master digital signal processor (DSP);
a first power source connected to the master DSP;
a first slave DSP connected to the master DSP;
a second slave DSP connected to the master DSP, wherein each of the plurality of SSPC channels are connected to both the first slave DSP and second slave DSP;
a second power source isolated from the first power source; and
a third power source shared by the plurality of SSPC channels.

8. The SSPC controller system of claim 7 further comprising an arbitration logic module connected to the master DSP, the first slave DSP, and the second slave DSP, the arbitration logic module connected to the second power source.

9. The SSPC controller system of claim 8 wherein the first slave DSP is connected to the second slave DSP.

10. The SSPC controller system of claim 7 wherein each of the SSPC channels includes a MOSFET and a MOSFET gate driver connected to the third power source controlling switching in the MOSFET.

11. The SSPC controller system of claim 10 further comprising a low drop out regulator (LDO) and diode combination connected to the third power source, the LDO and diode combination connected between the MOSFET and the MOSFET gate driver.

12. A method of providing power distribution functions in a line replaceable module, including:
providing control commands from a master digital signal processor (DSP) to a pair of slave DSP in a power distribution system;
controlling power distribution functions distributed through a plurality of solid state power channels (SSPC) using the pair of slave DSP wherein the pair of slave DSP are both connected to each channel in the plurality of SSPC channels; and
controlling via an arbitration logic module the power distribution functions using the pair of slave DSP.

13. The method of claim 12 including electrically isolating the master DSP from the pair of slave DSP and from the plurality of SSPC channels.

14. The method of claim 12 including providing a first power supply connected to the master DSP and a second power supply connected to the pair of slave DSP.

* * * * *